(No Model.)

S. C. SCHOFIELD.
Cake Griddle.

No. 237,051.  Patented Jan. 25, 1881.

Witnesses
Will P. Omolundro
J. A. Woodworth

Inventor
Silas C. Schofield
By Myers
Atty.

UNITED STATES PATENT OFFICE.

SILAS C. SCHOFIELD, OF FREEPORT, ILLINOIS.

CAKE-GRIDDLE.

SPECIFICATION forming part of Letters Patent No. 237,051, dated January 25, 1881.

Application filed November 18, 1880. (No model.)

*To all whom it may concern:*

Be it known that I, SILAS C. SCHOFIELD, a citizen of the United States, residing at Freeport, in the county of Stephenson and State of Illinois, have invented certain new and useful Improvements in Cake-Griddles; and I do hereby declare the following to be a full, clear, and exact description of the invention, such as will enables others skilled in the art to which it appertains to make and use the same, reference being had to the accompanying drawings, and to letters or figures of reference marked thereon, which form a part of this specification.

My invention relates to an improvement in cake-griddles; and it consists in the oblong griddle A, hinges $b\ b$, the circular griddles B B, having nibs $a\ a$, and adjustably secured to the oblong griddle A, and in the combination and arrangement of the parts, as hereinafter more fully described.

Figure 1:
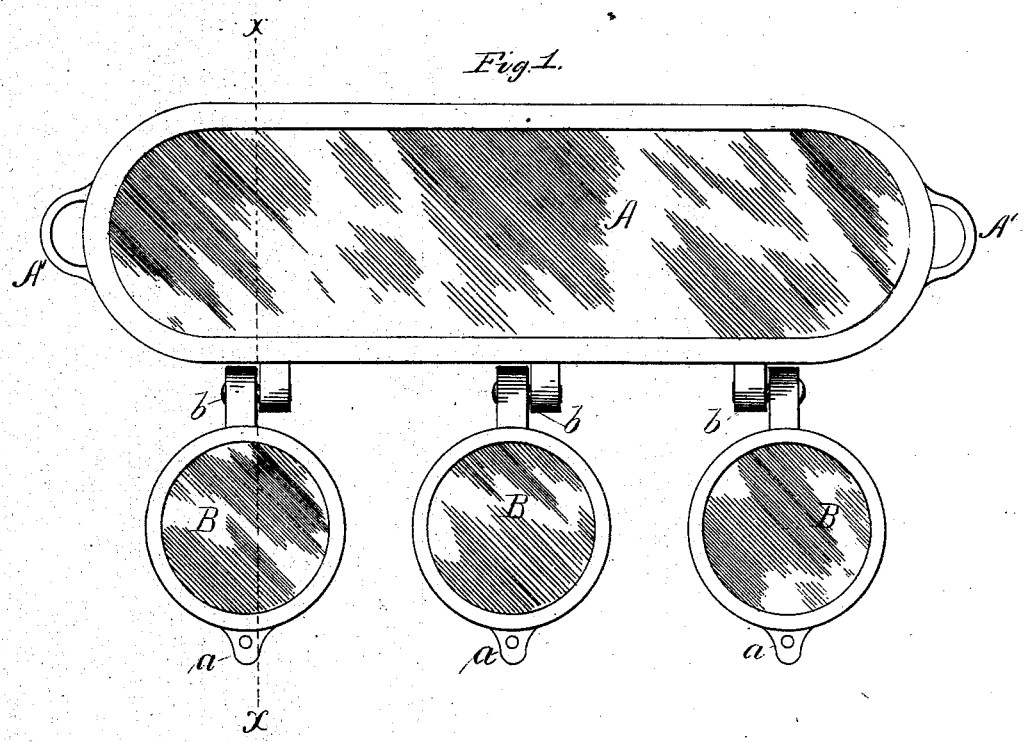
Figure 2:
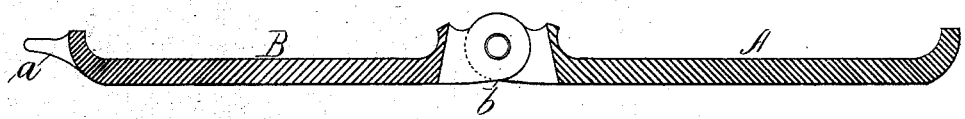

In the drawings, Figure 1 is a plan view of my invention. Fig. 2 is a sectional view on line $x$ of Fig. 1.

A represents an ordinary griddle-pan, having handles A' A', and cast solid therewith a part of the hinges $b\ b$. The circular griddles B B are secured by hinges $b\ b$ to the griddle-pan A, and are provided with the nibs $a\ a$. These nibs project horizontally a few lines above the plane of the bottom of the griddle, in order to enable the knife employed in turning the griddles to be thrust beneath said nibs. By this construction of my griddle each circular griddle may be turned separately.

In the process of cooking on griddles comprising several pans, as hitherto constructed, cakes are never all ready to be turned at the same time, and in consequence some of the cakes thus cooked are burned and others insufficiently baked or raw; and hence such griddles are practically a failure as to their intended purpose of cooking several cakes simultaneously, and this objection my griddle is designed to remedy.

What I claim is—

1. A cake-griddle composed of one oblong griddle-pan and two or more pans hinged thereto, and adjustable separately, substantially as shown, and for the purpose described.

2. The combination of the oblong griddle-pan A, hinges $b\ b$, and circular griddles B B, substantially as shown, and for the purpose described.

In testimony whereof I affix my signature in presence of two witnesses.

SILAS C. SCHOFIELD.

Witnesses:
 E. B. WINGER,
 F. O. MILLER.